United States Patent [19]

Itoh

[11] Patent Number: 5,433,851
[45] Date of Patent: Jul. 18, 1995

[54] FILTER AND FILTER MEDIUM USED IN SAID FILTER

[75] Inventor: Mikio Itoh, Tokyo, Japan

[73] Assignee: Roki Techno Co., Ltd., Tokyo, Japan

[21] Appl. No.: 226,977

[22] Filed: Apr. 13, 1994

[30] Foreign Application Priority Data

Aug. 24, 1993 [JP]  Japan ................... 5-050149 U

[51] Int. Cl.$^6$ ........................................... B01D 33/04
[52] U.S. Cl. ................... 210/386; 210/387; 100/120
[58] Field of Search .......... 210/350, 386, 387, 400, 210/401, 780; 100/120, 119

[56] References Cited

U.S. PATENT DOCUMENTS

| | | | |
|---|---|---|---|
| 2,313,702 | 3/1943 | Allen | 100/903 |
| 2,691,446 | 10/1954 | Murray . | |
| 3,169,922 | 2/1965 | Hornbostel | 210/387 |
| 4,676,902 | 6/1987 | Fayoux et al. | 210/350 |
| 4,681,688 | 7/1987 | Sondov et al. | 210/386 |
| 5,008,007 | 4/1991 | Anderson | 210/387 |
| 5,320,753 | 6/1994 | Keillor, III et al. | 210/387 |

FOREIGN PATENT DOCUMENTS 7705716 11/1977 Netherlands .............. 210/387

*Primary Examiner*—Stanley S. Silverman
*Assistant Examiner*—Theodore M. Green
*Attorney, Agent, or Firm*—Armstrong, Westerman, Hattori, McLeland & Naughton

[57] ABSTRACT

A filter designed in compact form and requiring low filtration cost, by which there is no need to replace filter each time it becomes clogged and for which no liquid for backwashing is required, and with which is possible to filter under liquid pressure. In the filter, two ends of a filtering segment with a predetermined length of a filter medium in an oblong tube shape are movably and closely squeezed and held by a pair of opposing pressure rollers. A raw liquid introducing pipe is closely squeezed and held between a pair of pressure rollers, a forward end of the raw liquid introducing pipe is disposed within the range of the filtering segment of the tube-like filter medium. The filter medium is moved to the filtering segment constantly or when the filter medium is clogged, and the clogged filter medium is moved beyond the range of the filtering segment.

5 Claims, 1 Drawing Sheet

FILTER AND FILTER MEDIUM USED IN SAID FILTER

BACKGROUND OF THE INVENTION

The present invention relates to a filter and a filter medium to be used in said filter, which can be effectively used in primary filtration for purification of industrial water or industrial waste water or for food industry including beverage industry, i.e. in a applications where there are too many impurities in a liquid and the use of filter cartridge is neither economical nor practical because the cartridge must be replaced too frequently.

For filtration in the applications for recycling of industrial water, a sand filter using sand, anthracite, etc. as filter media and a diatomaceous filter are used. In the diatomaceous filter, diatomaceous earth is coated on a filter medium of a filter cartridge using a metal screen etc. as the filter medium. After coating the diatomaceous earth, liquid to be purified is introduced. In recent years, as an alternative for the filter media such as sand, anthracite, etc., a modified sand filter which uses mop-like fibers or aegagropila-like fibers is propagated. In these types of filters, when the filter media become clogged, they are replaced in such manner that filter meshes are restored to the initial condition to some extent by backwashng using the raw liquid to be filtered and the filter media are replaced when they cannot be restored any more.

On the other hand, since the cost of the raw liquid itself to be used for backwashing is expensive in the food industry, there have been difficulties with the restoration of filter media by backwashing in terms of cost because the cost for bringing out the raw liquid for backwashing is too extensive. Therefore, when a filter cartridge in the filter used for such applications, becomes clogged it is general practice to replace it by a new filter cartridge. Although this filtration technique is a time-honored technique, a bag filter has been developed by technical progress in filter media in recent years, which uses a bag-shape filter cloth with a density gradient and made of fine fibers. Although the bag filter is now widely used, it must also be replaced with new bag filter when clogged.

There are many problems in conventional type filtration methods as described above, and it appears that none of these methods are completely satisfactory.

In the case of backwashing of a sand filter, there are problems not only with the cost involved in the use of a backwashing liquid as explained above, but also with the costs for processing such as cost of processing tanks, ultrafiltration (UF), reverse osmotic membrane filtration (RO), etc., and further, the processing cost of final waste liquid. If the problems of the processing costs are neglected, waste liquids are discharged thoughtlessly, and the problem of environmental pollution may occur.

In case of a filter cartridge, the problem of processing cost of concentrated liquid does not occur, but there are problems such as high cost due to the structure of filter cartridge itself, high frequency replacement of the cartridge filter and the outflow of foreign objects to secondary side when filter is replaced.

The bag filter is now widely used in recent years because the problem of the high cost of filter, i.e., the most serious problem of filter cartridge system, can be eliminated or foreign objects do not flow out to secondary side and can be processed as they remain in bag. However, a problem lies in the complicated procedure to replace bag.

Further, there is a conventional method which introduces raw liquid to a wind-up type sheet-like filter medium and which performs self-weight filtration. Because this filtration is by self-weight, unless the filtration tank is designed deeper to increase the applied liquid pressure, overflow may occur even when filter media are slightly clogged if they are not wound up. For this reason, it is not widely used in the field of precision filtration.

SUMMARY OF THE INVENTION

It is an object of the present invention to provide a filter, for which no backwashing liquid is required because there is no need to backwash and in which there is no need to replace the filter each time clogging occurs, and filtration can be performed by applying liquid pressure.

It is another object of the present invention to provide a compact and inexpensive filter which can filter at low cost.

Further, it is still another object of the present invention to provide a filter medium, which can be used in the above filter.

To attain the above objects, the filter according to the present invention comprises a filter medium designed in an oblong tube shape, both ends of a filtering segment with predetermined length of the filter medium are movably and closely and tightly squeezed and held by pressure rollers disposed at opposed positions, a raw liquid introducing pipe is closely squeezed and held between a pair of the pressure rollers, a forward end of said raw liquid introducing pipe is located inside said filtering segment of said tube-like filter medium, said filter medium is moved toward said filtering segment constantly or when filter medium is clogged, and filter medium of said filtering segment is moved beyond the range of the filtering segment.

In brief, the principle of the filter of the present invention is that, when clogging occurs, the filter medium designed in an oblong tube shape is wound up and rewound so as to eliminate the need to replace filter or to backwash, that the filter medium in the filtering segment is closely squeezed and held by opposing pressure rollers, and the raw liquid introducing pipe is squeezed and held by a pair of the pressure rollers to apply liquid pressure on the filter medium of filtering segment. Near the portion of the raw liquid introducing pipe protruding from filter medium, a cutter function is provided to tear off said filter medium, or a mechanism is provided to heat-seal the overlapped filter media to facilitate winding and rewinding.

In the filter medium according to the present invention, two ends of a filtering segment with a predetermined length of the filter medium, which is designed in an oblong tube shape with both sides welded together, are movably and closely squeezed and held by opposing pressure rollers, a raw liquid introducing pipe disposed inside said filter medium is closely squeezed and held between a pair of said pressure rollers, and upper portion of said filter medium is torn off by a portion of the raw liquid introducing pipe protruding from the filter medium. The raw liquid is introduced to the filtering segment with a predetermined length from said raw liquid introducing pipe, and said filter medium is moved toward said filtering segment constantly or when the filter medium is clogged, and the filter medium of said filtering segment is moved beyond the range of the filtering segment.

The above and other objects and advantage of the invention will become more apparent from the following description.

DETAILED DESCRIPTION OF THE PREFERRED EMBODIMENT

Figure 1:
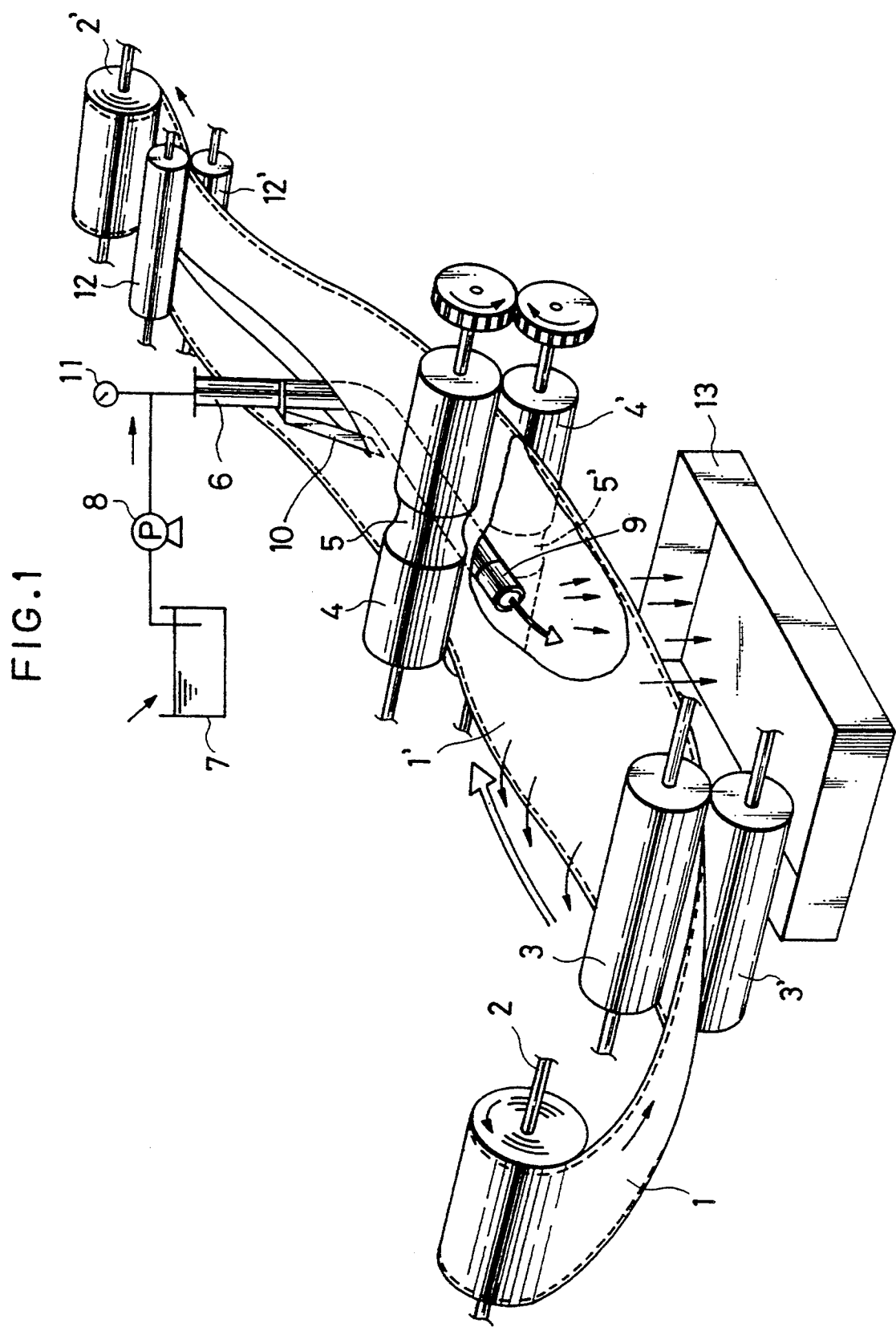
FIG. 1 is a schematic perspective view showing an embodiment of the present invention.

In the following, description will be given on an embodiment of the present invention, referring to the drawing.

FIG. 1 is a schematic general view of a filter according to the present invention.

First, a filter medium in oblong tube shape 1 (endless tube-like filter medium) of the present invention is prepared by providing polyester spun bonded unwoven cloth (density 200 g/m$^2$); apparent thickness 1.5 mm, and average pore size 20μ) and slitting the cloth to 250 mm in width and 100 m in length. Two of the unwoven cloths are overlapped, and the two ends of the cloths are supersonically welded by supersonic sewing machine to produce an endless tube, and this is wound up on a winding core 2. The reason to weld the two ends is that, when cloths are pulled by drive rollers (pressure rollers), the cloths tend to drift in transverse direction if the thickness of the ends vary widely. Depending upon the type of the filter medium, the cloths may be bent and welding may be performed on one end or at a point in the middle to form a tube-like shape.

The endless tube-like filter medium 1 set on the system is pressed by pressure rollers (rubber rollers 3 and 3') and pressure rollers (rubber rollers 4 and 4') in a liquid-tight condition.

Between the pressure rollers 4 and 4', ring-shaped recesses 5 and 5' are formed, and a raw liquid introducing pipe 6 is closely squeezed and held between the pressure rollers 4 and 4', and the raw liquid introducing pipe is closely squeezed and held between said recesses 5 and 5'.

The recesses 5 and 5' maintain the raw liquid introducing pipe 6 in closely fitted and fixed condition. In order that the pressure rollers 4 and 4' can be rotated without fail, the recesses 5 and 5' work together to form a bore, which has approximately the same diameter as that of the raw liquid introducing pipe 6.

The distance between the pressure rollers 3 and 3' and the pressure rollers 4 and 4' can be set to an adequate length depending upon flow rate of the raw liquid, quantity of foreign objects in the raw liquid, filtering accuracy of filter medium, etc. In the present embodiment, it is set to 600 mm.

The raw liquid to be filtered is supplied to the raw liquid introducing pipe 6 from a raw liquid tank 7 by a pump 8.

In order to place the raw liquid introducing pipe 6 into the endless tube-like filter medium 1, a slit must be provided on the endless tube-like filter medium 1. The above embodiment is designed in such manner that a cutter 10 is fixed on the raw liquid introducing pipe 6, and when the endless tube-like filter medium is moved, upper end of the endless tube-like filter medium 1 is slit. It is needless to say that there is no need to dispose a cutter 10 if the raw liquid introducing pipe 6 itself is provided with cutter function. In the above embodiment, a commercially available heat knife is used as the cutter 10 and temperature is set to 350° C., whereas any type of cutter may be selected according to the type of filter medium. For example, in case the filter medium is difficult to slit, it can be cut easily by an ultrasonic cutter.

In the above embodiment, the raw liquid introducing pipe 6 is squeezed and held between the pressure rollers 4 and 4' at forward position in the moving direction, while it may be held between the rear pressure rollers 3 and 3' in the moving direction. In this case, the endless tube-like filter medium 1 is in the same condition as it is moved in a direction reverse to the arrow direction in FIG. 1. Slit must be provided in advance and the portions of the filter media thus slit must be attached together in the filtering segment. Thus, it should be designed that the filter media are overlapped at the slit so that the slit portions can be easily attached together, and means for sticking the slit portions together is required instead of the cutter 10. As the sticking means, a heat roll may be used or an adhesive agent may be coated.

Because the endless tube-like filter medium 1 is closely fitted and held by the pressure rollers 3 and 3' and the pressure rollers 4 and 4', the raw liquid introduced into the endless tube-like filter medium 1 from a forward end 9 of the raw liquid introducing pipe 6 is discharged only from the filter medium 1 between four rollers, and the liquid does not leak between the pressure rollers 3 and 3' or between the pressure rollers 4 and 4'.

For the pressure rollers 3 and 3' and 4 and 4', urethane rubber is used in the above embodiment, while other rubber material may be used. Also, metallic or plastic rollers may be used in the present invention because these rollers provide a close sealing function depending upon material and properties of the endless tube-like filter medium 1.

When filtration is continuously performed through the filter medium 1 squeezed between the pressure rollers 3 and 3' as well as 4 and 4' the tube-like filter medium 1 becomes clogged, and the increase of pressure inside the raw liquid introducing pipe 6 is observed on a pressure gauge 11.

In the above embodiment, the pressure is 0.15 kg/cm$^2$ at the initiation of filtration and it gradually increases. When the pressure reaches 0.5 kg/cm$^2$, a signal is issued, and sequence control is performed in such manner that the drive rollers (pressure rollers) 4 and 4' and pulling rollers 12 and 12' are rotated. The endless tube-like filter medium 1 is rewound from the winding core 2 and is delivered in a length of about 60 cm. In this case, it is advisable to rotate the pressure rollers 3 and 3' at the same time in order to smoothly deliver the filter medium 1. The used filter medium thus moved out is wound up on the winding core 2'. There is no need to always wind up the used filter medium, and it may be dropped down into a container.

In the above embodiment, the filter medium 1 is moved intermittently. For designing of similar systems, the quantity of foreign objects in the liquid and clogging rate may be determined in advance, and the filter medium may be delivered slowly, for example, continuously at a speed of 1 to 3 cm per minute.

In the above embodiment, a one-inch stainless steel pipe is used as the raw liquid introducing pipe 6, while other material such as metal, plastics, etc. may be used, and there is no special restriction on material or size.

Next, description will be given on a test example, using the filter of the present invention shown in FIG. 1.

Water and kaolin powder were placed into a raw liquid tank 7 to reach a turbity of 30. The mixed liquid was introduced into the raw liquid introducing pipe 6 from a pump 8 at flow rate of 60 liters per minute to introduce the liquid into the tube-like filter medium 1'. The filtrate was collected in a filtrate tank 13 as shown by arrows. When filtration was started, a pressure of 0.15 kg/cm$^2$ was noted on pressure gauge, and pressure value of 0.5 kg/cm$^2$ was indicated on the pressure gauge 3 hours later. At this moment, a sensor was operated, and pressure rollers (drive rollers) 4 and 4' as well as rollers 3 and 3' were rotated, and the tube-like filter medium 1 was delivered in a length of about 60 cm. In other words, the filter medium 1' in the filtering segment had been replaced by a new filter medium.

The turbidity of the filtrate was 7 at the initiation of filtration, while the turbidity at the replacement of the filter medium under liquid pressure of 0.5 kg/cm$^2$ was 9, and it was not extensively reduced.

From the result of the above test, it is evident that 10.8 tons of polluted water with turbidity of 30 can be processed by the tube-like filter medium 1 of 60 cm in length within 3 hours.

As described above, according to the present invention, there is no need to restore mesh of the filter to initial condition by backwashing and to replace the filter by a complicated procedure because the clogged filter is sequentially moved by the rollers. Also, it is possible to use the filter medium until a pressure loss of a certain level is reached and filtration can be performed efficiently because the system is designed in compact form and the two ends of the filtering segment are closely squeezed and held by the rollers and filtration can be performed under liquid pressure. Further, filtration cost can be extensively reduced because the filter medium is designed as a low-cost endless tube.

What is claimed is:

1. A filter comprising a filter medium in an oblong tube shape, a filtering segment of said filter medium defined at two ends by opposing pressure rollers by being closely squeezed and held by said opposing pressure rollers, a raw liquid introducing pipe closely squeezed and held between a pair of said pressure rollers, a forward end of said raw liquid introducing pipe disposed inside said filtering segment of said tube-like filter medium, and means for moving said filter medium toward said filtering segment constantly or when the filter medium is clogged such that the clogged filter medium is moved beyond the range of the filtering segment.

2. A filter according to claim 1, wherein said raw liquid introducing pipe is closely squeezed and held between a pair of pressure rollers at forward position in a moving direction of said filter medium, and a cutter is fixed or cutter function is provided near a portion of said raw liquid introducing pipe which protrudes from said filter medium such that while said tube-like filter medium is moved forward, upper portion of the filter medium of said tube-like filter medium is torn.

3. A filter according to claim 2, wherein said forward pair of the pressure rollers have recesses formed therein, and said raw liquid introducing pipe is closely squeezed and held between said recesses of said forward pair of rollers.

4. A filter according to claim 1, wherein said opposing pressure rollers are made of rubber material.

5. A filter according to claim 1, further including a winding core for the filter medium and pulling rollers for moving said filter medium.

* * * * *